US012647279B2

(12) United States Patent
Jalili

(10) Patent No.: US 12,647,279 B2
(45) Date of Patent: Jun. 2, 2026

(54) METHOD FOR CREATING AND VALIDATING CRYPTOGRAPHICALLY SECURED GRAPHS IN DISTRIBUTED AND DECENTRALIZED NETWORKS

(71) Applicant: Vahid Jalili, Lexington, MA (US)

(72) Inventor: Vahid Jalili, Lexington, MA (US)

( * ) Notice: Subject to any disclaimer, the term of this patent is extended or adjusted under 35 U.S.C. 154(b) by 38 days.

(21) Appl. No.: 18/754,053

(22) Filed: Jun. 25, 2024

(65) Prior Publication Data

US 2025/0392473 A1     Dec. 25, 2025

(51) Int. Cl.
  *H04L 9/40*       (2022.01)
  *H04L 9/32*       (2006.01)
(52) U.S. Cl.
  CPC .................................. *H04L 9/3247* (2013.01)
(58) Field of Classification Search
  CPC ...................................................... H04L 9/3247
  See application file for complete search history.

(56) References Cited

U.S. PATENT DOCUMENTS

| | | | | |
|---|---|---|---|---|
| 10,725,838 | B2 * | 7/2020 | Fransazov | G06F 8/74 |
| 11,165,754 | B2 * | 11/2021 | Pattanaik | H04L 63/12 |
| 11,888,730 | B1 * | 1/2024 | Palermo | H04L 41/0816 |
| 2012/0215736 | A1 * | 8/2012 | Aharon | G06N 7/01 |
| | | | | 706/52 |
| 2014/0019490 | A1 * | 1/2014 | Roy | G06F 16/20 |
| | | | | 707/798 |

| | | | | |
|---|---|---|---|---|
| 2022/0286295 | A1 * | 9/2022 | Van Schouwen | H04L 9/3247 |
| 2022/0414664 | A1 * | 12/2022 | Liu | G06Q 20/4016 |
| 2023/0030230 | A1 * | 2/2023 | Lyons | H04L 9/0861 |
| 2023/0342356 | A1 * | 10/2023 | Singh | G06F 16/24542 |
| 2024/0020214 | A1 * | 1/2024 | Jha | G06F 11/302 |
| 2024/0119132 | A1 * | 4/2024 | Wieker | G06V 40/1365 |
| 2024/0171407 | A1 * | 5/2024 | Wright | H04L 9/3247 |
| 2024/0243934 | A1 * | 7/2024 | Moreau | G06Q 20/363 |
| 2025/0053546 | A1 * | 2/2025 | Paunoiu | G06F 16/211 |
| 2025/0070973 | A1 * | 2/2025 | Ferenczi | H04L 9/321 |

FOREIGN PATENT DOCUMENTS

| | | | | |
|---|---|---|---|---|
| GB | 2613584 A | * | 6/2023 | H04L 63/12 |

\* cited by examiner

*Primary Examiner* — Ghodrat Jamshidi

(57) ABSTRACT

A method for creating and managing graphs with crypto-graphically secured nodes and edges operated within a distributed and decentralized network is disclosed. The method establishes a digital signature chain between a node and its incoming and outgoing edges; hence the digital signature chain of a node and its connecting edges remains independent from other nodes' chain unless they share an edge, thereby enabling highly parallel operations. The method is adaptable to various graph topologies, from singular graph structures to modalities consisting of numer-ous smaller, distinct graphs. The method supports directed, cyclic, and temporal graphs with nodes and edges having both protocol and application specific immutable properties, and non-persisted mutable properties for nodes. The method enables pruning the digital signature chains, requiring only a predetermined number of recent edges for its functions; hence, optimizing computational and storage requirements by archiving older edges.

12 Claims, 5 Drawing Sheets

Edge

| Source node | 301 |
| Target node | 302 |
| Timestamp | 303 |
| Source node's memento | 304 |
| Previous signature generated using the private key associated with the source node's public key | 305 |
| Snapshot of the incoming edges | 306 |
| Application-specific properties | 307 |
| Cryptographic signature | 308 |

→O    Incoming edge to the source node
O→    Outgoing edge from the source node
⬡    Snapshot of the incoming edges

METHOD FOR CREATING AND VALIDATING CRYPTOGRAPHICALLY SECURED GRAPHS IN DISTRIBUTED AND DECENTRALIZED NETWORKS

PRIOR ART

National Institute of Standards and Technology (NIST), "Digital signature standard (dss)," FIPS PUB 186-2, National Institute of Standards and Technology, 1999.

FIELD OF THE INVENTION

This invention pertains to the domain of cryptography and graph theory, and more particularly, though not exclusively, to methods that leverage cryptographic techniques to ensure the security, integrity, and immutability of graph structures. These methods are particularly applicable within distributed and decentralized networks.

BACKGROUND OF THE INVENTION

Data collected for an application is used to answer application-specific questions, while breakthroughs in science are often made possible by deeply studying the complex interconnections within the data across different sources and disciplines. Unveiling such fundamental discoveries is commonly hindered by one major obstacle: data accessibility.

Data is typically collected, formatted, and stored to meet the specific needs of an analysis and to ensure compatibility with the tools used within a particular domain's ecosystem. While effective within a domain, this approach impedes a broader utilization of data in the quest for transformative breakthroughs. For instance, developing a personalized treatment plan for a cancer patient may involve integrating diverse data types, including their DNA sequencing data represented as sequences of nucleotide base pairs, their mutational profile characterized by the presence of specific somatic genetic variants at defined genomic positions, multiplexed immunofluorescence imaging data of tumor tissue with extracted metadata such as marker intensities, cellular morphology features, spatial distribution, and co-localization metrics, and potentially ongoing longitudinal data collected from wearable devices to monitor treatment progression. Integrating such diverse data representations often necessitates developing ad-hoc methods for data conversion and reformatting, which can be both time-consuming and error-prone.

Data accessibility challenges are particularly pronounced in ubiquitous machine learning-based solutions, where they require not only adherence to data encoding conventions and reformatting but also the development and training of machine learning models specific to each data representation. For instance, a model developed for mutational profiles, where information is represented as positions and genotypes in a Variant Call Format (VCF) file, may have a different architecture than a model developed for tumor images, where information is represented as pixel intensities in a Tagged Image File Format (TIFF).

The expressive power of graphs makes them a holistic data modeling approach for various domains as they can effectively model complex relationships. For instance, graph-based genome alignment, as alternatives to the commonly used linear sequence alignment, is increasingly gaining adoption due to its potential to effectively model complex genomic features such as structural variations. Modeling data that encompasses diverse information types as graphs makes the encapsulated knowledge interoperable with minimal adaptors; hence, alleviating the impediments imposed by domain and application-specific representations. Accordingly, graph-based data representations are gaining popularity, such that a growing community in the machine learning field is dedicated to developing graph-based models.

Current graph storage solutions predominantly revolve around centralized architectures, where the graph is either stored on a single persistence media, or distributed across the nodes of a cluster. Despite their benefits, such as potential service-level guarantees, centralized architectures introduce substantial limitations. For instance, cloud-based offerings can lead to vendor lock-in by leveraging means such as escalating the egress costs that makes data migration or access from alternative platforms costly, or it may require a certain level of replication across data centers to avoid additional costs incurred when accessing data from a different geographical region than the center hosting the data. Additionally, centralized modalities often lack transparency, which can lead to service providers enforcing data governance policies that prioritize their interests over unbiased data accessibility.

Distributed ledger technologies, particularly blockchain and Directed Acyclic Graph (DAG), have spearheaded the development of innovations to secure transactional data on distributed and decentralized networks using cryptographic basis rather than trust. These technologies have a myriad of advantages over centralized modalities, but their fundamental appeal is their transparency, decentralization, and distributed consensus. However, they are primarily developed for transactional data, such that storing non-transactional data is prohibitively expensive and impractical, limiting their applicability to data-intensive applications. Furthermore, DAG-based solutions, which generally model transactions as nodes and their validation as edges and are predominantly developed for faster and cheaper transactions, enforce an acyclic requirement, which prohibits their use for modeling inherently cyclic data.

There are blockchain-based solutions specifically designed for file storage; these systems store files as-is, without modeling the data they contain. While such solutions can be augmented to store the database files of a distributed graph database system, since they inherently secure file-level access, the graph-level granularity needs to be implemented at the database system level. For instance, verifying the creation of an edge with specific properties between two nodes is a graph-level function, while ensuring access to an immutable database file containing a subset of the nodes and edges in the database is a file-level feature. Such augmentations introduce several challenges, including increased complexity due to the separation of the file and data level controls. Moreover, it defeats the purpose of using a blockchain-based solution if data-level functions are implemented through alternative mechanisms. Additionally, since these solutions operate at the file level, every database query could translate to requesting a database file from the blockchain-based file storage system, which is potentially computationally expensive and costly.

SUMMARY OF THE INVENTION

An embodiment of the present invention provides a method and system for creating graphs with inherent cryptographic security implemented at the graph-level, where the nodes and edges are created asynchronously and persisted in a distributed and decentralized peer-to-peer network. The graphs are cyclic, directed, and can be temporal, ensuring compatibility with a wider range of data modalities. Additionally, the proposed method is highly scalable as nodes and edges can be created in parallel as there is only linear sequence dependency between edges in a small community of nodes in the graph. This method is applicable to a variety of graph sizes, ranging from small graphs modeling molecules to large-scale graphs such as those found in social networks (for brevity, the term "graph" is used throughout this disclosure to refer to all types of graphs, including but not limited to those mentioned). Furthermore, it allows for nodes and edges to have various properties and supports heterogeneity, where nodes or edges differ in their properties. The cryptographic security of the nodes and edges in the present invention builds upon the technological advancements developed for cryptocurrency, specifically the digital signature chain; however, the present invention provides a generic graph structure with wide-ranging applicability, including potential embodiments suitable for cryptocurrency applications.

The graph in the present invention models entities as nodes and the relationship between them as edges, which aligns with the common formulation of graphs. For instance, a node can represent a bank account with edges being deposits and withdrawals from the account for incoming and outgoing edges, respectively. To align with the cryptographic security requirements, the properties of nodes and edges are immutable, with all edges being timestamped. However, for expressiveness and applicability to domains where entities have dynamic properties, nodes can have non-persisted computed properties whose value at a given time is determined by the edges connected to the node at earlier times. For instance, in the above bank account example, the balance of an account is a non-persisted computed property whose value at a given time is calculated as the sum of all the withdrawals and deposits at earlier times. Accordingly, edges model both the dynamics of non-persisted calculated properties of nodes in addition to static relationships between them (e.g., x is a sibling of y).

One aspect of the present invention pertains to using cryptographic techniques to secure the immutability of the properties of nodes and edges, such that, these properties cannot be altered without invalidating their digital signatures. Accordingly, a node can only be created by a party in possession of a public and private key pair; and at its creation, a hash of all properties of the node is signed using the private key, yielding the node's digital signature. The public key and the digital signature of the node are then persisted alongside other immutable properties of the node, which can then be used to cryptographically verify if the properties of the node are tampered with.

Similarly, an edge can be created by a party in possession of the private key associated with the source node's public key. Hence, only outgoing edges can be created, with incoming edges to a node being outgoing edges from another node. Edges are timestamped, and their properties include the relationship type and, optionally, the dynamics of a calculated property. For instance, an edge of type transfer of x amount at time t from one bank account to another in the above example. All the properties of an edge are immutable, and their immutability is cryptographically secured, similar to the immutable properties of the nodes. Accordingly, at its creation, a serialization of all properties of an edge is cryptographically signed using the private key associated with the public key of the source node. The digital signature of the edge is then persisted alongside other immutable properties of the edge, which can be used to verify the integrity of the edge's properties cryptographically. Additional details on creating nodes and edges will become apparent in the view of the detailed descriptions section and associated figures.

The method in the present invention preserves the creation order of the edges. In one embodiment, the order is represented by the timestamp of edge creation, while in other embodiments, it can be any indicator of edge precedence. Accordingly, the method natively supports temporal graphs. For simplicity, timestamps are used as the edge precedence markers throughout this disclosure, and "time" denoting any point in the precedence; however, the method does not impose any specific requirements.

Another aspect of the present invention pertains to the properties of nodes and edges. These properties are designed to support key aspects, including broad applicability across diverse domains, scalable cryptographic security, and a scalable and reliable methodology for calculating the computed properties of nodes at any given time. For instance, in the above example, the properties are designed to ensure the balance of an account is computed accurately at a given time, is cryptographically tamper-resistant (e.g., no withdrawals or deposits can be skipped or duplicated), and effectively scales to large volumes of transactions. Accordingly, nodes and edges can have any number of properties, hence accommodating both feature-rich nodes and edges. Additionally, the cryptographic signatures of outgoing edges from a node form a linear dependency, which has two major advantages; first, it ensures no outgoing or incoming edge can be skipped or duplicated. Second, similar to blockchain technology, the longer the chain is, the deeper the cryptographic trust in its reliability and irreversibility. Additional details of this aspect of the invention will become apparent in the view of the detailed descriptions section and associated figures.

Moreover, an outgoing edge contains a "memento" of the source node, which can be used to retrieve the value of computed properties of the source node at the time of creating the outgoing edge without further calculation. For instance, in the above bank account example, the memento states the balance of the account at the time of a withdrawal. This design pattern has numerous advantages; its primary application is that it acts as a cryptographically secured snapshot of the source node's properties at a given time, and it also allows for pruning and archiving the chain of outgoing edges for various optimization purposes, including computation time and storage requirements. For instance, in the same context as the above example, instead of calculating the balance by processing all the transactions since the account opened, which can be a computationally expensive operation for accounts with high transaction volumes, the process can start from the balance of the account recorded in the memento of the last n-th outgoing edge and only compute transactions from that point onward. n is a configurable number, and it can be chosen deep enough in the cryptographic chain so to increase the reliability and authenticity of the snapshot. Additional details on creating and using this aspect of the invention will become apparent in the view of the detailed descriptions section and associated figures.

Additional properties, applications, and advantages of the invention according to the present application will become apparent from the view of the following detailed descriptions and associated figures.

DETAILED DESCRIPTION OF THE INVENTION

The present invention provides a method and system for creating graphs with inherent cryptographic security implemented at the graph level; designed for operation and compatibility within a distributed and decentralized peer-to-peer network, and allowing for the asynchronous creation of nodes and edges while ensuring their integrity through cryptographic means, without compromising their broad applicability. In one embodiment, nodes and edges of the graph are immutable and irreversible, such that once created, they cannot be altered or excluded. The present invention creates graphs with minimal additional properties and maintains the properties of nodes and edges in their raw format (i.e., without storing them as hashed or compressed encodings). This approach ensures that the properties are accessible without the need for cryptographic mechanisms (e.g., decoding or decryption), making them readily available for potential downstream analysis, including graph-based artificial intelligence solutions.

This section provides a detailed description of an exemplary embodiment of the invention. While the detailed description in this section provides numerous specifics for the purpose of illustration, anyone of ordinary skill in the art will appreciate that many variations and adaptations of the discussed details of the graph structure are encompassed within the scope of the invention. Accordingly, the following embodiments of the invention are set forth without any loss of generality and without imposing limitations upon the claimed invention.

Additionally, for a clear and concise description, the explanations focus on a variation of the graph where each node has a unique cryptographic identity, such as a private and public key pair. This approach is suitable for a wide range of use cases. However, there are other variations, such as when a group of nodes is created using common private and public key pairs. For instance, when modeling genetic variations of individuals using the graph structure in the present invention, where nodes represent variations, then in one implementation, nodes belonging to an individual may share a cryptographic identity. All such variations are embodiments of the invention discussed in this disclosure and fall within its scope.

Figure 1:
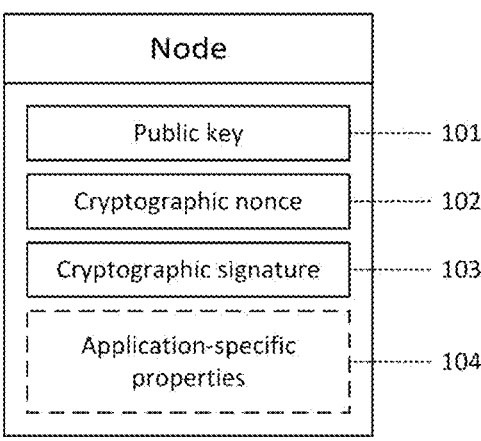
FIG. 1 is a diagram showing the properties of a node.

FIG. 1 shows the properties of nodes in one embodiment of the present invention, encompassing both the required and application-specific properties. Each node is created using cryptographic credentials; while the method in the present invention does not impose specific requirements, for simplicity, private and public key pairs are used as the credentials throughout this disclosure. These credentials can be created using various cryptographic methods; in one embodiment, the Elliptic Curve Digital Signature Algorithm (ECDSA), a widely recognized and secure method for digital signatures based on elliptic curve cryptography, can used to generate public and private keys, and cryptographically sign data.

The following is a description of the properties of nodes, and the process of creating a node using these properties is discussed next. 101 is the public key of the key pair used when creating the node. 102 is the cryptographic nonce of the node, which is a string of sufficient entropy. 103 is the cryptographic signature of the node. 104 represents any application-specific properties for the node. For instance, in one embodiment where nodes are used to model the bank accounts, account open date and account type can be among the application-specific properties of the node.

Figure 2:
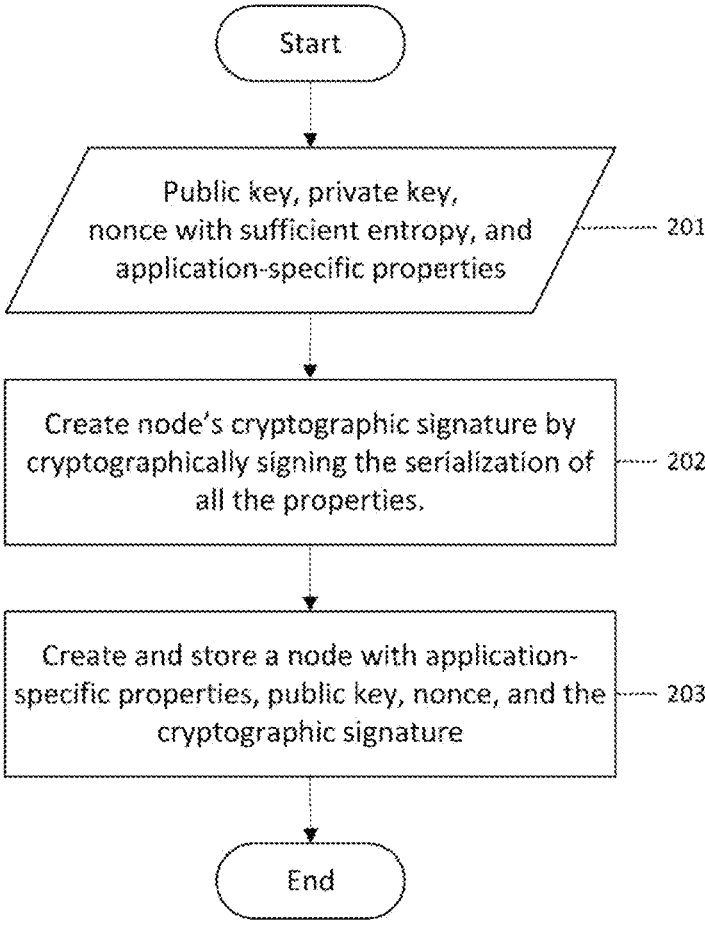
FIG. 2 is a flowchart of a routine for creating a node, given the needed properties.

FIG. 2 illustrates a flowchart of a routine to create a node. In order to create a node, the requesting party must provide a public and private key pair, a cryptographic nonce with sufficient entropy and all the application-specific properties (201). The method then serializes the public key, nonce, and all the application-specific properties, which is then cryptographically signed using the provided private key, yielding the digital signature of the node (202). The system then creates and stores the node, setting its public key, nonce, application-specific properties, and digital signature (203).

In one variation of the present invention, the method can also persist the serialization of node properties to avoid the computational cost of their re-serialization, which is necessary for verifying digital signatures (discussed in detail in the following sections). Retaining the serialization leads to increased storage requirements, hence, presenting a tradeoff between storage and computational costs. In this disclosure, the serialization of nodes and edges (discussed in detail in the following sections) is not persisted and is re-computed when needed.

The properties persisted with a node entity provide sufficient information to verify their integrity. Accordingly, the integrity is cryptographically verified using the node's digital signature, its public key, and a serialization of its properties (i.e., the same serialization approach employed when creating the node). If the verification is successful, it confirms that the node's properties have remained unchanged since their creation; otherwise, it indicates potential tampering or alteration of the properties.

Figure 3:
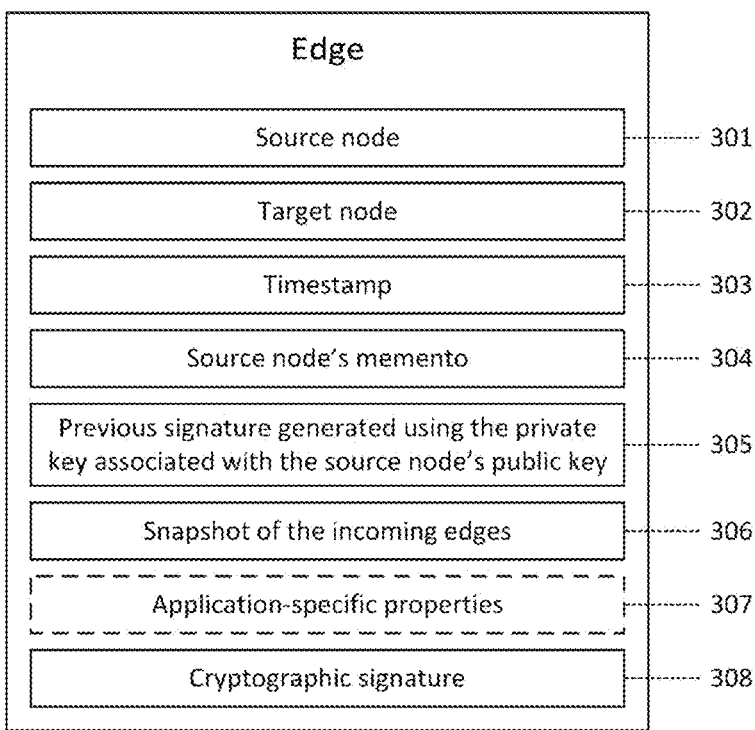
FIG. 3 is a diagram of edge properties.

FIG. 3 illustrates a diagram of the properties of edges in one embodiment of the present invention. Each of the properties is described in the following, and the process of creating an edge and setting these properties is discussed thoroughly in the explanation of FIG. 6.

301 and 302 reference the source and target nodes of the edge, respectively. In one embodiment of the invention, the nodes can be referenced using their public keys, which serve as their unique identifiers.

303 is the timestamp of the edge creation time in one embodiment of the present invention. As previously mentioned, this property serves as the edge precedence marker, and it can be of any type that indicates order, since the method does not impose any specific requirements. However, for simplicity, throughout this disclosure, the timestamp is used as the precedence marker. In one embodiment, this could be the epoch time, also known as Unix time or POSIX time, which counts the seconds since it 00:00:00 UTC on Jan. 1, 1970.

304 is used to restore the values of computed properties of the source node at edge creation time—without further computations. In one embodiment, this property can be implemented using the widely recognized memento design pattern. Accordingly, 304 contains the values of all computed properties at the time of creating the edge. For instance, in the previously mentioned bank account example, the memento of an edge contains the account balance before a withdrawal is made from the account. This property serves multiple purposes, including computational efficiency and storage optimization. Concerning computational efficiency, it allows the determination of the value of computed properties of the source node without having to traverse all the incoming and outgoing edges of the source node prior to a given time. Instead, an outgoing edge of the source node provides a snapshot of the value of computed properties at that point in time. From a storage perspective, since not every incoming and outgoing edge is needed to determine the value of computed properties of the source node, edges prior to a given time can be pruned and, in one embodiment, stored in an archive. Furthermore, it provides a cryptographically secured snapshot of the source node's properties at the time of edge creation, which can be used to study the "state" of the source node at that time without any further calculations.

305 represents the previous digital signature generated using the private key associated with the source node's public key. This property is either the digital signature of a previous outgoing edge from the source node, or, if the source node does not have any prior outgoing edges, it is the digital signature of the source node itself (i.e., 103). The process of determining the value of this property is discussed thoroughly in the explanation of FIG. 6.

306 is a snapshot of incoming edges to the source node that have not been accounted for in any prior outgoing edges from the source node; in other words, these are the incoming edges to the source node that have not been referenced before in any outgoing edge from the source node. These incoming edges can be used to determine the value of computed properties of the source node as a delta from the prior outgoing edge from the source node. In one embodiment of the present invention, this property can be implemented as a set of digital signatures of the incoming edges. If the source node does not have any incoming edges or if all the incoming edges are previously referenced in prior outgoing edges from the source node, then this property can be an empty set. The process of determining the values of computed properties of the source node using such snapshots is discussed thoroughly in the explanation of FIG. 6. More details on setting the value of this property will become apparent in the discussion of the example illustrated in FIG. 4.

Figure 8:
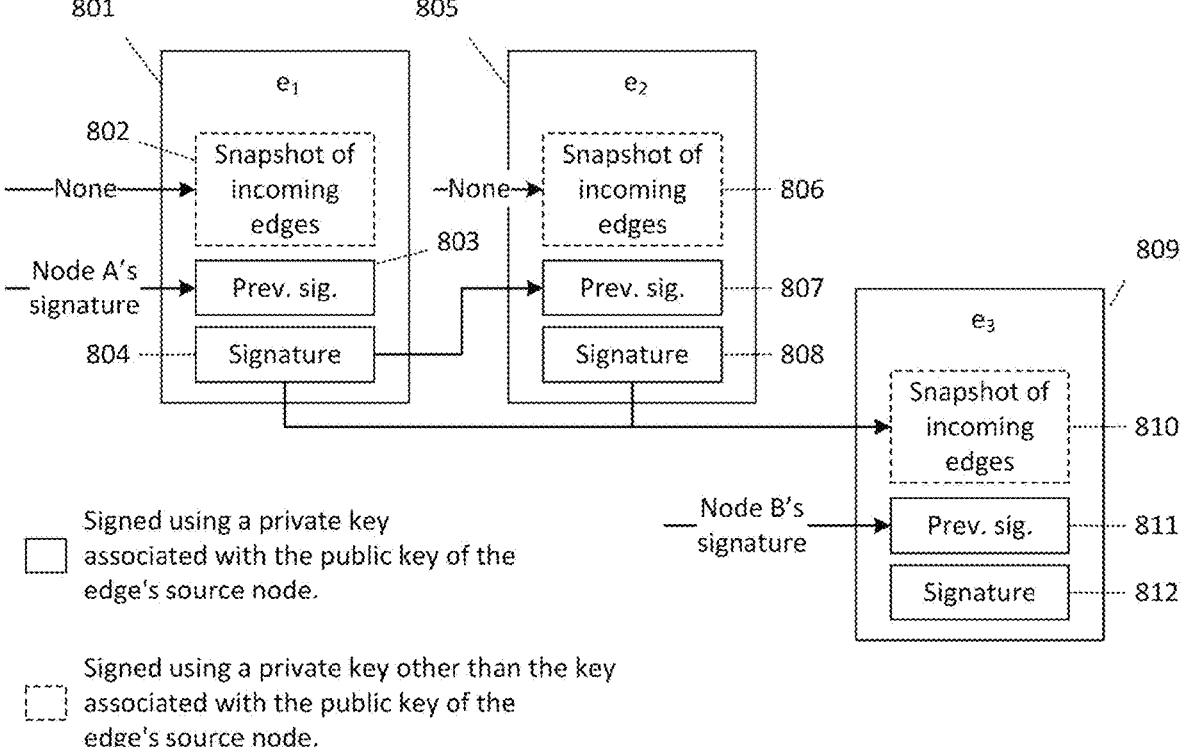
FIG. 8 is a diagram illustrating the edges created for the example given in FIG. 7, with their simplified properties and the relations between them.

Accordingly, the properties represented in 305 and 306 collectively form a digital signature chain between the source node and a sequence of incoming and outgoing edges to that node (see FIG. 8 as an example). Outgoing edges can be created using the private key associated with the source node's public key (as discussed in the explanation of 308), and the incoming edges reference the source node (i.e., 302); hence, the method effectively creates a digital signature chain between the entities created by the party in possession of a public and private key pair and the edges targeted to the public key.

307 represents all the application-specific properties of an edge. These properties can encompass both the dynamics of non-persisted calculated properties of the source node and static relationships between the source and target nodes. In one embodiment, these properties encompass the relationship type and its properties. For instance, if the source node models a scientist and the target node models a scientific paper, the relationship type can be authored, and the properties can be implemented as key-value pairs such as field: cryptography and year: 2024.

308 is the digital signature of the edge. It is created by cryptographically signing a serialization of all the properties of the edge, using the private key associated with the source node's public key.

Figure 4:
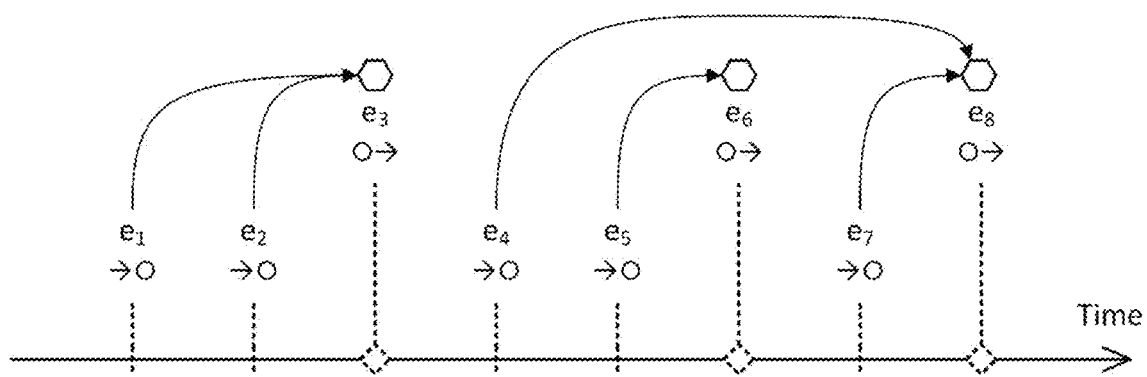
FIG. 4 illustrates an example of incoming edges referenced in the snapshot property of outgoing edges from a given node.

FIG. 4 illustrates an example of referencing incoming edges to a node in the snapshot property (306) of the outgoing edges of that node. In this figure, $e_1$ and $e_2$ are incoming edges to the source node, which are referenced in the snapshot property of $e_3$, an outgoing edge from the source node. Since $e_1$ and $e_2$ are referenced in $e_3$, they will not be added to the snapshot property of any subsequent outgoing edges. $e_4$ and $e_5$ are both incoming edges to the source node at an earlier time than the outgoing edge $e_6$. Generally, they should be referenced in the snapshot property of $e_6$. However, given that the method in the present invention allows for the asynchronous and parallel creation of edges in a distributed and decentralized network, it accommodates corner cases where an incoming edge is not referenced in an outgoing edge during high-volume transactions within short time frames. $e_4$ is such an edge that is not referenced in the snapshot property of the outgoing edge $e_6$, which only references $e_5$. This feature of the present invention is similar to eventual consistency property in the CAP theorem (Consistency, Availability, and Partition tolerance). as the method ensures that an incoming edge will eventually be referenced in the snapshot property of an outgoing edge, and once referenced, it will be included in the digital signature chain and will not be omitted again (discussed in details in the explanation of FIG. 6). In the example in FIG. 4, $e_4$ is referenced in the snapshot property of the outgoing edge $e_8$ along with $e_7$.

Figure 5:
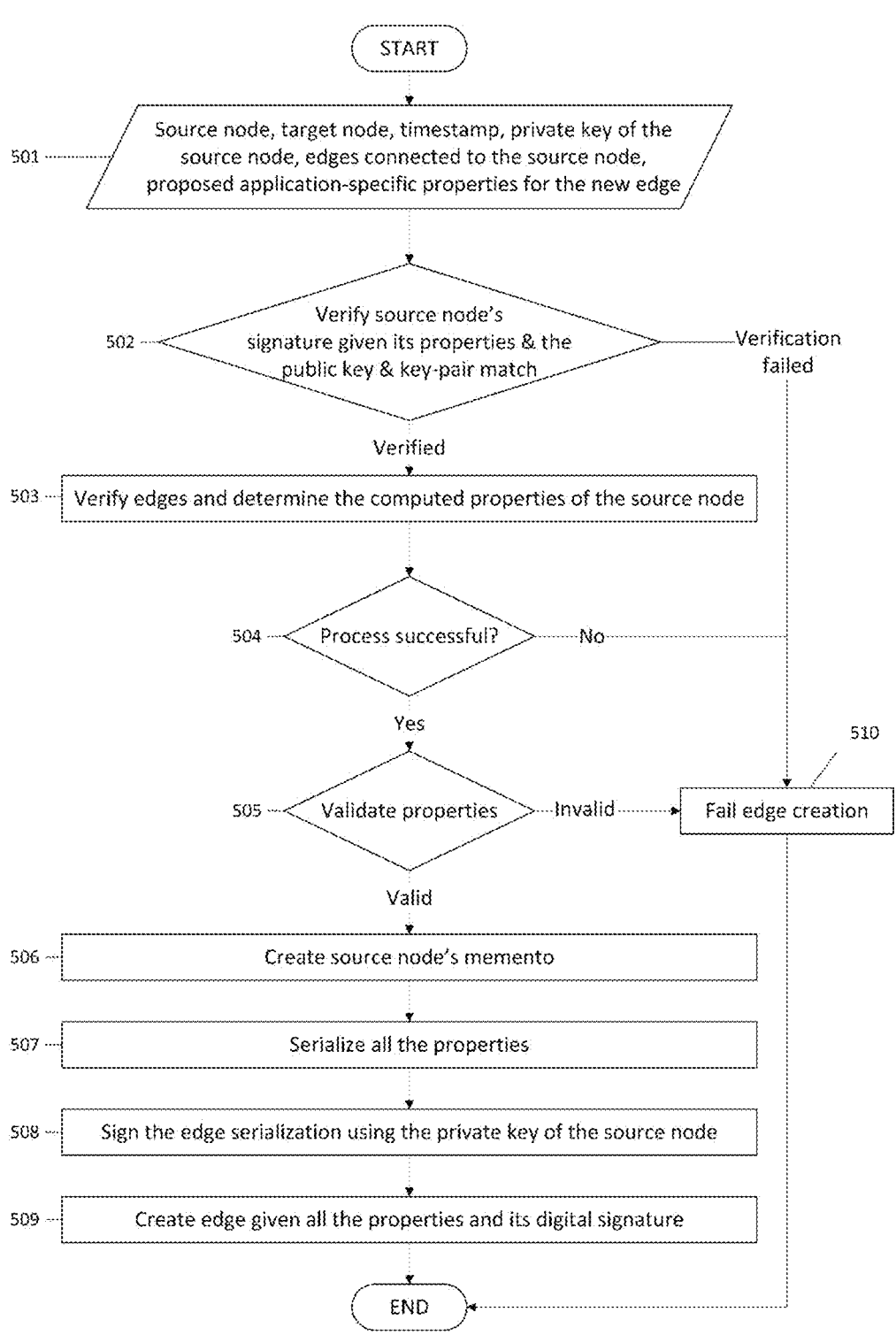
FIG. 5 is a flowchart of a routine for creating an outgoing edge, given the source and target nodes, the properties of the edge, and the edges connected to the source node.

FIG. 5 shows a flowchart of a routine to create an edge in one embodiment of the present invention. The process takes as input the source node, target node, the current epoch time as the timestamp of the edge to be created, and the private key associated with the public key of the source node (501). Additionally, the flowchart takes as input the set of the incoming and outgoing edges connected to the source node. This set is then used to cryptographically assert the integrity of the node and edge properties, and used for determining the current values of computed properties of the source node. This set can contain all the incoming and outgoing edges connected to the source node, and in one embodiment, the set can be pruned to contain the latest n edges. The higher the n the longer is the digital signature dependency of the outgoing edges from the source node, hence the higher is the trust on the cryptographic integrity of the signatures. Additionally, the flowchart takes as input the application-specific properties of the edge to be created. As discussed previously, these properties can be defined as static attributes or defined as a function of computed properties.

502 verifies the integrity of the properties of the source node. Accordingly, using the public key in the source node's properties (101) and a serialization of the properties, 502 verifies the digital signature of the node. Additionally, it checks if the provided private key corresponds to the public key of the source node. If both verifications are successful, it indicates that the properties of the source node have remained unchanged, and an outgoing edge from the source node is being requested by the party in possession of its public and private key pair. For instance, in the previously mentioned bank account example, this assertion indicates that a transfer from a bank account is requested by the owner of that account. If any of the verifications fail, in one embodiment of the present invention, this leads to the termination of the edge creation process (510), and then exiting the routine.

If both verifications succeed, the routine proceeds to 503, which verifies the digital signatures of the incoming and outgoing edges of the source node, checks the integrity of their digital signature chain, and determines the current value of the computed properties of the source node. This process is illustrated in the flowchart in FIG. 6 and discussed in detail in the description of the figure. The flowchart in FIG. 6 performs various operations and verifications; it may exit with either a pass or fail status. If it succeeds, it returns the source node with the current value of computed properties, a list of incoming edges to be included in the snapshot property of the edge to be created (i.e., 306), and the last digital signature created using the private key associated with the public key of the source node. The successful execution of this process is verified at 504, and if it fails, in one embodiment of the present invention, this leads to the termination of the edge creation process (510), followed by exiting the routine.

If the process outlined in step 503 is successful, step 504 advances the routine to step 505, which assesses the proposed application-specific properties of the edge (referenced in step 501) and their potential impact on the computed properties of the source node. The validation in step 505 is application-specific and includes all necessary checks to ensure the validity of the edge properties and to verify whether the inclusion of the edge preserves the validity of the computed properties of the source node. For instance, in the bank account example described earlier, the account balance is determined in step 503, and step 505 verifies whether the proposed transfer amount is less than or equal to the account balance of the source node. If the value of the static or computed properties of the source node are invalid, or if an edge with the given properties invalidates application-specific criteria, the assertion in step 505 fails, which, in one embodiment, leads to the failure of edge creation in step 510.

If the assertion in step 505 is successful, the routine continues by creating a memento of the source node in step 506. In one embodiment, the memento is implemented following the memento design pattern, where the memento object is used to store and retrieve the values of the computed properties of the source node at the time of creating the edge. For instance, in the bank account example, the memento object stores the balance of the account at the time of creating the outgoing edge from the source node.

After step 506, all the properties of an edge to be created are determined (see FIG. 3), except for the digital signature of the edge, which is determined in steps 507 and 508. Step 507 serializes all the properties of the edge to be created to prepare them for input to a digital signature algorithm. Similar to the serialization of node properties, the method in the present invention does not impose any specific requirements on the edge serialization method, as long as it is compatible with the digital signature algorithm.

Step 508 employs a cryptographic digital signature algorithm, such as ECDSA, to cryptographically sign the serialized edge properties generated in step 507. The digital signature algorithm uses the private key associated with the public key of the source node to create a unique digital signature. This signature is intrinsically linked to the source node's public key and can be used to verify whether the edge was generated by the entity in possession of the corresponding private key. For instance, in the previously mentioned bank account example, the signature can be used to assert if the account owner has authorized a withdrawal from the account.

Finally, step 509 creates the edge with all the determined properties and the computed digital signature. The immutability of the edge properties is cryptographically enforced through the digital signature, ensuring the integrity of the edge properties.

Figure 6:
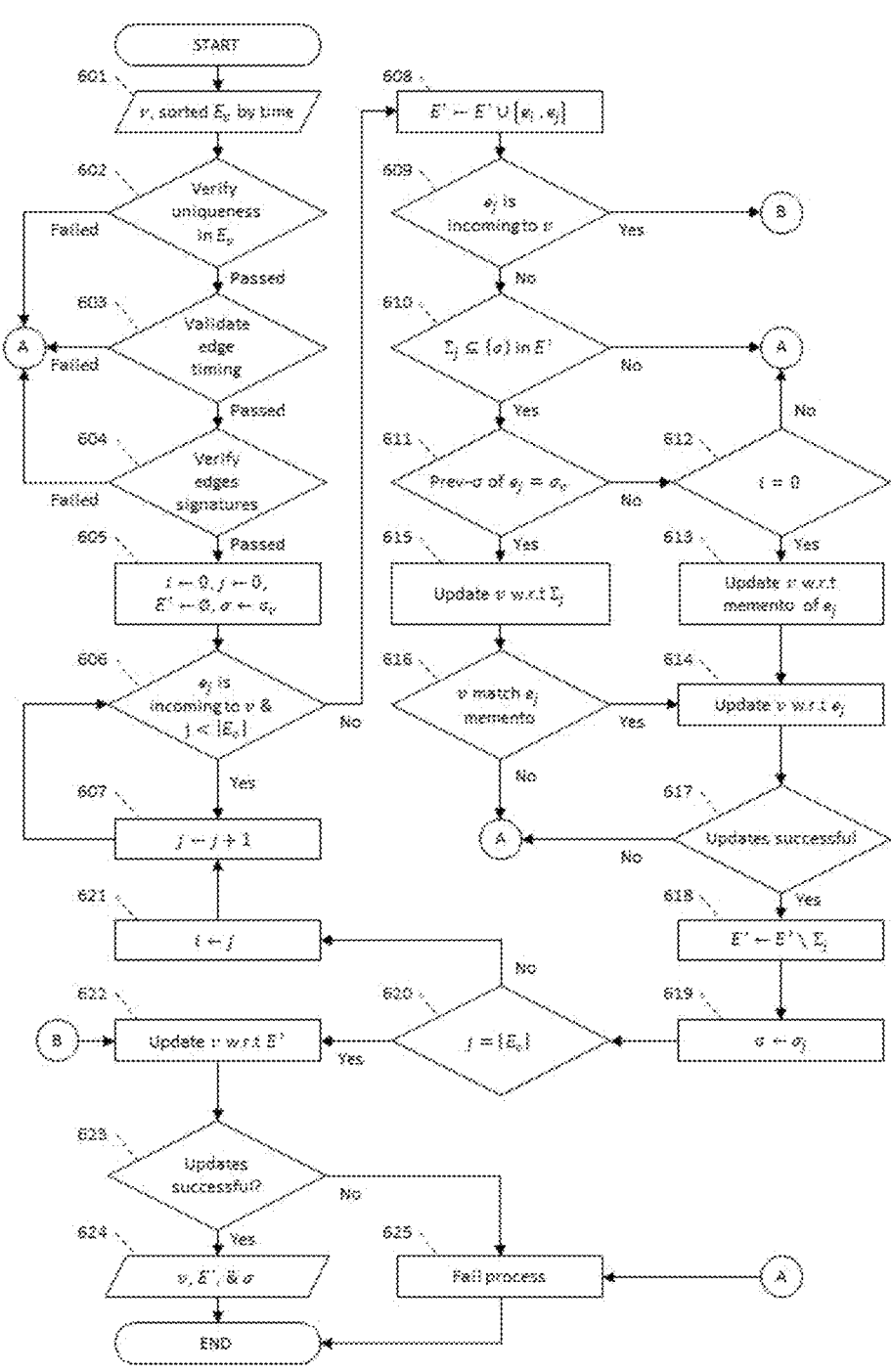
FIG. 6 is a flowchart of a routine that implements the verification and determination of non-persisted computed properties of a source node before creating an outgoing edge.

FIG. 6 illustrates a flowchart of a procedure for verifying the integrity of a node, determining the values of its computed properties, and assessing the integrity and digital signature chain dependency of the edges connected to the node, according to one embodiment of the present invention. This method performs these multiple operations in a single iteration over the edges connected to the node. The rationale for this approach is optimization, as it requires only a single iteration over the edges. However, in other embodiments of the present invention, this process may be divided into multiple operations, each dedicated to performing one of the aforementioned tasks.

Due to the numerous steps illustrated in FIG. 6, we use mathematical notation to denote the properties of nodes and edges, and mathematical expressions to succinctly describe operations. Each notation and expression are explained in detail when discussing the relevant step.

The flowchart illustrated in FIG. 6 takes as input the source node (v) of the flowchart in FIG. 5 and the set of all edges connected to this node (Ep), as shown in component 601. The edges in $E_v$ are sorted in ascending order based on their epoch time attribute (i.e., 303). This sorting ensures that the edges with the oldest and newest timestamps are positioned as the first and last items in the list, respectively. Additionally, the edges in $E_v$ should be unique. In one embodiment, this uniqueness can be achieved by using the digital signature of each edge as its unique identifier. This uniqueness is verified in step 602; if the verification fails, the edge creation process is terminated as specified in step 625 in one variation of the present invention. For simplicity, 625 ends the flowchart with a failed status (e.g., signaling a failure to 504); however, other variations may include additional operations such as error correction or retry options. Throughout this disclosure, for simplicity, we focus on the termination of the flowchart with a failed status, although extensions are within the scope of the invention. The procedure advances to the subsequent step in the flowchart if 602 successfully verifies the uniqueness in $E_v$.

In one embodiment, two outgoing edges from a source node cannot have identical timestamps, and there should be at least a one-unit difference in the smallest time unit (e.g., millisecond) between them. This criterion is incorporated into the flowcharts in the presented disclosure, particularly in the flowchart illustrated in FIG. 6. Accordingly, if an edge in $E_v$ violates this criterion, it indicates that either the edge has been tampered with or incorrect input has been provided to the procedure illustrated in the flowchart in FIG. 6. This check is performed in step 603; a failure in this verification, results in the failure of the process via the step 625.

If the verification in 603 is successful, the procedure proceeds to step 604, where it verifies the signatures of the incoming and outgoing edges connected to the source node v. The verification process involves serializing the properties of the edges and then verifying the digital signature using the public key of the source node and the edge serialization. As discussed earlier, the specifics of the digital signature verification algorithm depend on the digital signature algorithm used. Most widely used schemes like ECDSA have their own verification algorithms. If the verification in step 604 is unsuccessful, the procedure proceeds to step 625 where it fails the process.

In a variation of the present invention, step 604 can also include the verification of the signature of the source node ($\sigma_v$) using the serialization of the source node's properties, its digital signature, and public key. However, in the procedure illustrated in FIG. 6, $\sigma_v$ verification is omitted because this step is assumed to have already been performed in an earlier step 502, thereby avoiding redundant verification.

If the verification in step 604 is successful, the procedure continues to iterate over the incoming and outgoing edges to determine and validate the computed properties of the source node v, as well as to ensure the integrity and sequential dependency of the properties and signatures among the edges connected to it. Accordingly, at step 605, the procedure initiates the necessary variables for this purpose. The variables i and j, with initial values of 0, are indexes defined on the sorted set of the edges connected to the source node, $E_v$. 605 also defines the variable $\sigma$, with the initial value of $\sigma_v$, the digital signature of the source node v. Moreover, an empty set of edges, $E' \leftarrow \emptyset$, is defined; incoming edges are added and removed from this set throughout the procedure.

The set E' serves a dual function; first, it is used to verify the integrity of outgoing edges, ensuring that the list of incoming edges accounted for in the outgoing edge (e.g., their impact on the computed properties and their cryptographic signature snapshot, see 306) is a subset of E'. In other words, E' is used to verify that $E_v$ contains all the incoming edges previously recorded in the snapshot property of the outgoing edges. Second, in one embodiment where edges are concurrently created in a distributed setup, there may be instances where an incoming edge to node v from node u, $e_{uv}$, is created in close temporal proximity to an outgoing edge from node v, $e_{vx}$. Since the creation of outgoing edges from nodes v and u are independent, both edges can create successfully. Hence, it is possible that $e_{uv}$ is not accounted for and not recorded in the snapshot of the outgoing edge $e_{vx}$. The set E' is utilized to identify such "missed" incoming edges and incorporate them into subsequent outgoing edges, thereby ensuring that no incoming edge is omitted and maintaining both the computed properties of the source node and the integrity of the digital signature chain. The specifics of this process are explained in detail in the relevant sections of the flowchart.

In step 606, the procedure checks whether the edge at index j, denoted as $e_j$, is an incoming edge to the source node v and whether the index j has not reached the end of the set of edges connected to the source node (denoted by $|E_v|$, the cardinality of the set). To determine if $e_j$ is an incoming edge to node v, one approach is to compare the public key of node v with the public key of the target node of $e_j$. If both of these conditions are satisfied, the procedure increments the value of j in step 607 and rechecks the conditions. This process continues until either of the conditions is not met.

Accordingly, steps 607 and 607 result in iterating over the set $E_v$ starting from the current position of j, which initially is at the beginning of the set, until it encounters an outgoing edge or reaches the end of the set. In other words, since $E_v$ is sorted based on the epoch time of the edges, steps 606 and 607 result in iterating over batches of edges as follows:

From the earliest edge in $E_v$ (i.e., the beginning of the set) until the first outgoing edge;

From the earliest edge in $E_v$ until the current time (i.e., the end of the set), if the source node does not have any outgoing edges;

Incoming edges between two consecutive outgoing edges from the source node;

Between the last outgoing edge from the source node and the current time.

These batches of edges are denoted by $[e_i, e_j]$, which refers to the edges at indexes i and j, inclusive, and all the edges between them.

If the verification at step 606 fails, the procedure continues to step 608, where the edges in batch $|e_i, e_j|$ are added to the set E', denoted $E' \leftarrow E' \cup [e_i, e_j]$. Step 609 checks if $e_j$ is an incoming edge to the source node v. Given the condition in step 606, the condition at step 609 is met only when j points to the last edge in $E_v$, which is an incoming edge. In other words, this condition is met when the source node does not have any outgoing edges, or the iteration through steps 606 and 607 reaches the last batch of edges in $E_v$, which contains incoming edges created after the last outgoing edge. If this condition is met, the procedure continues to step 622, where it updates the computed properties of the source node v based on all the edges in E'. This procedure is application-specific and depends on the computed properties and the application-specific properties of the edges, as defined in element 307. For instance, in the previous bank account example, assuming E' contains an incoming edge representing a deposit, the balance property of node v would be updated to reflect the balance after accounting for the deposit transaction.

The condition at step 623 verifies if the computed properties of the source node v were updated successfully. This check fails if any errors occur during the process of updating the computed properties, or if the determined values of the computed properties fail to meet their domain-specific criteria. For instance, in the previous bank account example, if one criterion dictates that the account balance cannot be negative, then the condition at step 623 fails if the computed value of the account balance is determined to be negative. If this check fails, the procedure terminates the process with step 625. Otherwise, the procedure continues to step 624, which, in one embodiment of the present invention, returns the source node v with its determined computed properties, the set E' containing all the incoming edges to be recorded in the snapshot property (see 306) of an outgoing edge to be created, and $\sigma$, the last digital signature created using the private key of the source node. Additionally, it signals the upstream procedure (e.g., the procedure in FIG. 5) of a successful execution of the flowchart.

If the condition in step 609 is not met, which occurs if $e_j$ is an outgoing edge from the source node, then the procedure continues to step 610. Step 610 verifies whether the edges referenced in the snapshot property of $e_j$, denoted $\Sigma_j$, are a subset of or equal to the edges in E'. $\Sigma_j = E'$ when all incoming edges from previous batches are accounted for in previous outgoing edges. For instance, referring to the example in FIG. 4, $\Sigma_j = E'$ if $e_4$ is referenced in $e_6$ rather than in $e_9$. $\Sigma_j \subset E'$ when there are "missed" incoming edges; such as $e_4$ in the example in FIG. 4 when j=9. This aspect of the method will be more apparent when discussing step 618.

Note that, in one embodiment of the present invention, $\Sigma_j$ references incoming edges by their digital signatures. In this variation, since $\Sigma_j$ only contains the signatures of the edges and not all their properties, the comparison with E', which contains the edges with all their properties, is based on the digital signatures. Thus, the subsetting verification compares the digital signatures in $\Sigma_j$ with those in E'. This operation is denoted as $\Sigma_j \subseteq \{\sigma\}$ in E' for brevity in step 610. An alternative notation is: $\Sigma_j \subseteq \{\sigma_k | k \in [|E'|]\}$ where $\sigma_k$ denotes the digital signature of the edge at index k, and $[|E'|]$ denotes a set of integers from 1 to the cardinality of set E', inclusively.

Furthermore, when referring to the digital signatures of nodes and edges, we are referring to the digital signatures stored as properties of nodes and edges. However, in other embodiments of the present invention, these properties can be generated on a just-in-time basis (i.e., generated when needed). This design choice can be motivated by the trade-off between storage and computational needs.

If the condition verified at step 610 is not met, it indicates that either the outgoing edge $e_j$ is tampered with and its $\Sigma_j$ property is modified, or $E_v$ is missing some edges previously processed. In this case, the procedure fails with step 625.

If the condition at step 610 is met, the procedure continues to step 611, which involves verifying the digital signature chain of the signatures generated using the private key of the source node v. In this step, 611 verifies whether the previous digital signature property in the outgoing edge $e_j$ (i.e., 305) correctly refers to the previous outgoing edge of the source node (see step 619) or to the digital signature of the source node if $e_j$ is the first outgoing edge of the source node (see step 605).

If the condition at step 611 is not met, the procedure continues to step 612 where it checks if the current batch of edges is the first batch or not (i.e., i=0). If it is not the first batch (i.e., i>0), then given the signature chain verification failure at 611, it indicates that the either the edges are tampered with or $E_v$ is missing some previously processed edges. Hence, the procedure continues to fail the process with step 625. However, if it is the first batch, the signature mismatch is explained by the pruned edges, where only the given number of latest incoming and outgoing edges to a source node are provided. As discussed before, this optimization helps with the processing time where it relies on the source node memento stored at an outgoing edge to reconstruct the value of the computed properties at the time of creating the outgoing edge rather than further processing the incoming and outgoing edges. Additionally, it helps optimizing disk usage.

If the condition at step 611 is not met, the procedure continues to step 612, which checks whether the current batch of edges is the first batch (i.e., i=0). If it is not the first batch (i.e., i>0), then the signature chain verification failure at 611 indicates that the edges have either been tampered with or that $E_v$ is missing some previously processed edges. As a result, procedure proceeds to fail the process with step 625. However, if it is the first batch, the signature mismatch can be attributed to pruned edges, where only a specified number of the latest incoming and outgoing edges to a source node are provided. As previously discussed, this approach optimizes disk usage and minimizes the number of edges required to determine the computed properties of the source node. It achieves this by using the source node memento stored at an outgoing edge (see 304) to retrieve the value of the computed properties at the time of edge creation, eliminating the need for processing older incoming and outgoing edges.

Accordingly, if the signature chain verification fails (611) for the first batch (612), it indicates that edges were pruned and the memento securely stored at the outgoing edge from the source node, $e_j$, can be used to determine the value of the computed properties of the source node without processing older edges. In this case, step 613 sets the computed properties of the source node based on the memento stored at edge $e_j$.

Note that it is important to check the number of batches processed after the memento was used to ensure that it is followed by a significant number of outgoing edges whose signature chain meets the criteria (i.e., satisfies the verification at 611). This is necessary to trust the authenticity of the edges and the use of the memento. If the signature chain does not match (i.e., 611 fails) and only one batch of edges is processed, then there is insufficient evidence to trust the chain of digital signatures, and there is a possibility that the edges were tampered with. Accordingly, in one embodiment of the present invention where such edge pruning is implemented, the procedure should incorporate minimum chain length assertions and fail if the chain depth is too shallow after the memento is used. One way to implement this is to count the number of batches processed after the memento was used, and if the iteration reaches the last batch before a minimum number of batches are processed, then the procedure should fail. Implementing this check is straightforward; hence, it is not included in the flowchart in FIG. 6 to maintain focus.

If the signature chain verification at step 611 is successful, the procedure continues to step 615, where it updates the computed properties of the source node based on the edges referenced in the snapshot property (306) of $e_j$. Note that, in one embodiment of the present invention where the incoming edges are referenced by their digital signatures in the snapshot property of $e_j$, denoted $\Sigma_j$, the procedure should match the signatures in $\Sigma_j$ with edges in E' to identify the referenced edges and use them to update the properties of the source node v. In other words, the procedure uses $\{e | e \in E' \wedge \sigma_e \in \Sigma_j\}$ to update the properties.

In one variation of the present invention, after step 615, step 616 compares the computed properties of the source node v with the values of computed properties cryptographically secured in the memento property of the edge $e_j$. This verification serves as an additional check of edge dependency and integration assertion. In other embodiments, this verification may not be strictly necessary given the stringency of digital signature-based verification, or it can be extended to cover domain-specific checks comparing the properties of the node w.r.t their cryptographically secured memento. If the verification at step 616 fails, indicating that the determined computed properties do not match their previously computed values, the procedure fails with step 625.

After step 613 or when the verification at step 616 is successful, the procedure continues to step 614, which updates the computed properties of the node v w.r.t the properties of the edge $e_j$. Note that the properties of v after the updates at steps 615 or 613 reflect their values at the time of creating the outgoing edge $e_j$. For instance, in the previously mentioned bank account example, this represents the balance of the account before creating a withdrawal transaction. Meanwhile, the properties of v after the update at step 614 reflect the value of properties after accounting for $e_j$. In the bank account example, this is the balance of the account after withdrawing from the account. Step 617 verifies if all the updates were successful, which is a domain-specific verification process, similar to 623. If the updates are unsuccessful, the procedure terminates with step 625.

If all the updates are successfully verified, the procedure continues to step 618. This step removes the edges referenced in the snapshot property of the edge $e_j$, denoted $\Sigma_j$, from E'. After this operation, E' contains only the incoming edges that have not been included in the snapshot properties of any previously processed outgoing edges. For instance, in the example illustrated in FIG. 4, when j=3, E' is an empty set, while when j=6, E' contains a reference to $e_4$.

The procedure continues to step 619, where it sets the value of σ to the digital signature of edge $e_j$, denoted $σ_j$, which is the most recent digital signature generated using the private key associated with the public key of the source node v. Accordingly, any subsequent outgoing edges should reference this digital signature as their previous outgoing edge signature (see 305), hence forming the digital signature chain.

At step 620, the procedure verifies if the iteration has reached the end of the set of edges connected to the source node v. If true, the procedure continues to step 622. Otherwise, it proceeds to other batches of edges by setting the value of i to j (denoted i←j) at step 621, and then continues to step 607. This process repeats the iteration for the next batch of edges in $E_v$ and processes them according to the steps outlined above.

Figure 7:
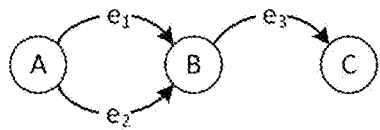
FIG. 7 illustrates an example graph.

FIG. 7 illustrates an example graph, and FIG. 8 shows the components of the present invention created to represent that graph. The graph in FIG. 7 consists of three nodes, A, B, and C, and three directed edges $e_1$, $e_2$, and $e_3$. The indexes of the edges represent their precedence; thus, in ascending order, the edges are $e_1$, $e_2$, and $e_3$. The goal of these figures is to illustrate the digital signature chain dependency between the edges as one aspect of the present invention that enables the cryptographic security and integrity of the edges in a distributed and decentralized setup. For simplicity, the figures do not include all the properties of the edges. Generalizing the process discussed in these figures to include all the properties of the edges and nodes is straightforward.

The methods described in the present invention create the edge $e_1$ as shown in 801. 802 represents a set of digital signatures of the incoming edges from the creation of node A until the creation of $e_1$ (see 307). Since there are no incoming edges to node A within this time interval, the value of this property is an empty set. 803 refers to the last signature generated using the private key of the source node, which is set to the signature of the source node, A. 804 is the signature of the edge, generated by cryptographically signing the serialization of all the properties of the edge using the private key of the source node A.

Note that the set of digital signatures referenced in an edge can be categorized into two groups: signatures generated using the private key of the source node of the edge, and signatures generated using other private keys. To clarify this distinction, FIG. 8 differentiates these groups with solid and dashed outlines for the former and latter groups, respectively.

The edge $e_2$, represented by 805, is an outgoing edge from A to B, created later than $e_1$. Similar to 802, 806 is also an empty set, as there are no incoming edges to A that were not recorded in the snapshot property of $e_1$. The value of the 807 property is set to the signature of $e_1$, since it is the most recent digital signature generated using the private key of the source node A. 808 is the digital signature of $e_2$.

The edge $e_3$ is an outgoing edge from B to C, created at a later time than $e_1$ and $e_2$, represented using 809. Since $e_1$ and $e_2$ are the incoming edges to B, and $e_3$ is the first outgoing edge since they were created, therefore, $e_1$ and $e_2$ are referenced in 810. Since $e_3$ is the first outgoing edge from B, 811 refers to the digital signature of the node B. 812 is the digital signature of the edge $e_3$.

The edge $e_3$ is an outgoing edge from B to C, created later than $e_1$ and $e_2$, as represented by 809. Since $e_1$ and $e_2$ are incoming edges to B and $e_3$ is the first outgoing edge since their creation, both $e_1$ and $e_2$ are referenced in 810. As $e_3$ is the first outgoing edge from B, 811 refers to the digital signature of node B. 812 is the digital signature of the edge $e_3$.

The invention claimed is:

1. A method of implementing a graph protocol, comprising: creating a plurality of nodes, wherein at least one node includes a digital signature; creating a plurality of edges, wherein at least one edge includes a digital signature; establishing a digital dependency chain between select nodes and edges to create interdependencies among them; verifying the integrity of the graph elements, which involves checking the digital signatures and analyzing the digital dependency chains, wherein the validity of at least one graph element is cryptographically dependent on a preceding graph element, to confirm authenticity and validity of the connections.

2. The method of claim 1 wherein the outgoing edges from a node form a digital signature dependency chain, which begins with the first outgoing edge directly dependent on the digital signature of the node, and each subsequent outgoing edge is dependent on the digital signature of the preceding outgoing edge from the same node.

3. The method of claim 2 wherein the digital signature of each edge further comprises the digital signatures of incoming edges to the node.

4. The method of claim 1 wherein the node properties comprises: a public cryptographic key, and a cryptographic digital signature, created by cryptographically signing a serialization of all node properties.

5. The method of claim 4 wherein the method further comprises both immutable and mutable properties for nodes.

6. The method of claim 5 wherein the immutable properties of nodes are persisted, and the mutable properties are not persisted, rather their value is determined based on the edges connected to the node.

7. The method of claim 6 wherein said mutable properties of the nodes are determined at a specific point, based on the precedence of said edges, considering only those edges that have earlier precedence relative to said specific point.

8. The method of claim 1 wherein the edge properties comprises: a reference to the source node, a reference to the target node, an indicator of edge precedence, and a cryptographic digital signature created by cryptographically signing a serialization of all edge properties.

9. The method of claim 8 wherein the edge properties further comprise: a reference to incoming edges to the source node that are not referenced in any prior outgoing edges from the source node.

10. The method of claim 8 wherein the edge properties further comprise: the value of the non-persisted mutable properties of the source node at the time of the outgoing edge's creation.

11. The method of claim 10 wherein said persisted properties are utilized to determine the values of non-persisted properties for nodes based on a predefined number of the most recent edges connected to the node, rather than utilizing all edges connected to the node.

12. The method of claim 1 wherein the properties of nodes and edges further comprise application-specific properties.

* * * * *